United States Patent [19]

Weimer et al.

[11] Patent Number: 5,384,291

[45] Date of Patent: Jan. 24, 1995

[54] CARBOTHERMAL SYNTHESIS PRECURSORS

[75] Inventors: Alan W. Weimer; Kevin J. Nilsen, both of Midland, Mich.

[73] Assignee: The Dow Chemical Company, Midland, Mich.

[21] Appl. No.: 83,112

[22] Filed: Jun. 25, 1993

[51] Int. Cl.$^6$ ............................................. C04B 35/52
[52] U.S. Cl. .................................. 501/81; 501/80; 501/82; 501/83; 501/87; 501/90; 501/96; 501/97; 501/98; 501/99; 501/100; 501/101
[58] Field of Search ............... 106/162, 169, 170, 186, 106/210, 214; 501/99, 101, 100, 127, 80, 81, 87, 90, 96, 97, 98, 82, 83

[56] References Cited

U.S. PATENT DOCUMENTS

| | | | |
|---|---|---|---|
| 3,421,919 | 3/1969 | O'Connor et al. | 23/191 |
| 3,459,566 | 8/1969 | Wilson et al. | 106/44 |
| 3,480,573 | 11/1969 | Thompson et al. | 260/17.2 |
| 3,485,776 | 12/1969 | Bruner et al. | 260/17.3 |
| 3,583,933 | 6/1971 | Tanaka et al. | 260/17.3 |
| 3,796,583 | 3/1974 | Bungs et al. | 106/38.8 |
| 3,983,084 | 9/1976 | Alexander et al. | 260/17.2 |
| 4,089,691 | 5/1978 | Cummisford et al. | 501/133 |
| 4,320,074 | 3/1982 | Birchall et al. | 501/127 |
| 4,337,193 | 6/1982 | Szita | 260/97.5 |
| 4,339,361 | 7/1982 | MacPherson et al. | 527/303 |
| 4,391,642 | 7/1983 | Stevenson et al. | 106/38.23 |
| 4,397,652 | 8/1983 | Neumann | 8/524 |
| 4,414,337 | 11/1983 | Ichikawa et al. | 501/103 |
| 4,431,744 | 2/1984 | Kernion et al. | 501/101 |
| 4,454,239 | 6/1984 | Cassens, Jr. | 501/101 |
| 4,482,654 | 11/1984 | Nishikawa et al. | 523/145 |
| 4,566,553 | 12/1985 | Suganuma et al. | 424/52 |
| 4,600,733 | 5/1986 | Ohashi et al. | 523/144 |
| 4,755,494 | 7/1988 | Ruben | 501/148 |
| 4,761,184 | 8/1988 | Markessini | 106/203 |
| 4,775,704 | 10/1988 | Nagahori et al. | 523/143 |
| 5,132,255 | 7/1992 | Takeuchi et al. | 501/97 |
| 5,240,498 | 8/1993 | Matalon et al. | 501/99 |

FOREIGN PATENT DOCUMENTS

| | | | |
|---|---|---|---|
| 2335689 | 3/1974 | Germany . | |
| 2545502 | 4/1976 | Germany | 106/162 |
| 263521 | 1/1989 | Germany . | |
| 48-048532 | 7/1973 | Japan . | |
| 57-045861 | 9/1982 | Japan . | |
| 8514522 | 1/1985 | Japan . | |
| 60-36311 | 2/1985 | Japan . | |
| 60-044147 | 3/1985 | Japan . | |
| 61-178409 | 8/1986 | Japan . | |
| 02221161 | 9/1990 | Japan . | |
| 3271108 | 12/1991 | Japan . | |
| 4243907 | 9/1992 | Japan . | |

OTHER PUBLICATIONS

A. W. Christiansen et al., "Potential of Carbohydrates for Exterior-Type Adhesives", Forest Products Journal, vol. 36, No. 7/8 (Jul./Aug. 1986).

IS Kim et al., "Influence of Additives on Nitridation of Metallic Silicon in Si3N4 bonded SiC", *Proc. 2nd Int. Conf. Refractories (Tokyo)* 974–82 (1987) no month.

ASTM D4179-82 Standard Test Method for Single Pellet Crush Strength of Formed Catalyst Shapes no date.

'Sugar-Modified Melamine Resins' *Sugar: Chem. Biol., Nutr. Aspects Sucrose Meeting* (1971) by Flavell et al., pp. 69–79 no month.

"Physico-chemical Modification of Starch of Various Origin", E. Nebesny et al. *Act. Alimentaria Polonica,* vol. XII, No. 2 (1986) no month.

*Primary Examiner*—Anthony Green

[57] ABSTRACT

Ceramic precursor materials bound together by a product of a condensation reaction between a first reactant that has at least one reactive hydroxyl moiety, such as a carbohydrate, and a second reactant that has at least one reactive nitrogen-containing moiety, such as melamine, and dried or dried and calcined, form porous aggregates that resist crushing or disintegration during processing through various reactor apparatus.

11 Claims, No Drawings

CARBOTHERMAL SYNTHESIS PRECURSORS

BACKGROUND OF THE INVENTION

The present invention generally concerns ceramic powders. It specifically concerns precursor materials or aggregates used to prepare ceramic powders via carbothermal synthesis. It particularly concerns precursor materials containing binder materials that are products of a reaction between at least one reactive hydroxyl moiety-containing carbonaceous compound and at least one reactive nitrogen moiety-containing compound.

Carbothermal synthesis or carbothermal reduction reactions commonly produce a variety of ceramic powders. The powders include nitrides such as aluminum nitride, silicon nitride and boron nitride, carbides such as silicon carbide, titanium carbide and boron carbide, and borides such as titanium diboride. The powders result from high temperature reactions between carbon and a metal oxide such as alumina, silica or titania. If a carbide is desired, the reaction typically takes place in the presence of an inert gas such as argon. If a nitride is desired, the reaction typically takes place in the presence of a nitrogen source such as gaseous nitrogen. If a boride is desired, a solid or gaseous source of boron must also be present.

Carbothermal synthesis reactions typically occur in any one of several conventional reactors. The reactions may be batch, semicontinuous or continuous. Known reactors include fixed bed reactors, pusher furnaces (U.S. Pat. Nos. 5,112,579 and 4,702,900), moving fixed bed reactors (U.S. Pat. Nos. 4,292,276 and 3,032,398), fluidized bed reactors (U.S. Pat. No. 5,108,713), rotary reactors (U.S. Pat. No. 4,368,181 and 3,802,847), and transport flow reactors (U.S. Pat. Nos. 5,190,737; 5,126,121; and 5,110,565; and PCT WO 90/08105 and 90/00276).

As a first step in a carbothermal reduction reaction, the carbon, metal oxide and any other solid reactants, catalysts or additives that may be required are typically converted into an intimate blend by wet or dry milling or blending procedures. Depending upon the type of reactor, the intimate blend may be used either as a dried powder or in the form of an aggregate. The aggregate typically contains a material that functions as a temporary binder. The binder material provides the aggregate with sufficient strength to allow handling during initial stages of a carbothermal synthesis reaction. As the reaction progresses to increasingly higher temperatures that are needed to carbothermally reduce the metal oxide, the temporary binder desirably volatilizes and exits the reactor.

The temporary bindery where used, desirably provides the aggregate with sufficient strength and physical integrity to withstand mechanical forces present during processing. In other words, the binder minimizes, if not eliminates, a tendency of an aggregate body to break apart when subjected to mechanical forces such as those generated when bodies rub against each other or reactor surfaces during processing.

An aggregate that breaks apart easily is particularly undesirable when using a fluidized bed reactor or a transport reactor. Breaking apart or "dusting" may lead to separation of the carbon from the metal oxide. This, in turn, impedes the reaction and may lead to an incomplete reaction product that contains an undesirable fraction of unreacted metal oxide. Dusting also typically leads to a reduced yield as very fine residue from broken aggregates is lost overhead in an apparatus such as a fluidized bed reactor. In addition, for systems with larger aggregates (e.g. fixed beds, moving fixed beds and rotary reactors) dusting impedes inert or reactant gas flow through a mass or bed of aggregate bodies. Gas flow may also be restricted to channels that form in the bed thereby leading to nonuniform flow of gas through the bed. Furthermore, dusting can dramatically reduce radiative heat transfer in favor of increasing conductive heat transfer within the bed. The latter is much slower than the former and typically leads to a reactor throughput that is much lower than would be possible with only radiative heat transfer.

SUMMARY OF THE INVENTION

The present invention is a crush-resistant, porous aggregate comprising carbon, at least one oxide, a binder and, optionally, at least one nonoxide, the binder being a product of a condensation reaction between (a) at least one first reactant that is selected from the group consisting of monosaccharides, disaccharides, polysaccharides, starches, modified starches, soy protein, cellulose ethers and cellulose ether derivatives and (b) at least one second reactant having at least one reactive nitrogen-containing moiety.

DETAILED DESCRIPTION

As used herein, "crush-resistant" means a crush strength, as measured in accordance with American Society for Testing and Materials (ASTM) Test D 4179-82, of greater than 20 Newtons (N).

As used herein, "porous aggregate" means a solid material having a total intrusion, as measured by mercury intrusion porosimetry, of greater than 0.1 cubic centimeters per gram (cc/g) for oxides such as aluminum oxide. When the oxide is heavier and more dense, as in the case of tungsten trioxide, a lower limit for total intrusion may be 0.02 cc/g.

As used herein, "condensation reaction" means a type of chemical reaction in which two or more molecules combine, with the separation of water, alcohol or other simple substance, to form a product having a longer chain length than any of the molecules from which it is formed. The products are referred to as "condensation products".

As used herein, "reactive nitrogen-containing moiety" means a portion of a molecule having at least one nitrogen atom that combines with a hydroxyl group of a second molecule in a condensation reaction.

Any carbon source conventionally used in carbothermal synthesis reactions is suitable for use with the present invention. The carbon source is desirably selected from the group consisting of carbon black, acetylene carbon black and products resulting from calcination of a carbohydrate such as a starch or sucrose, a hydrocarbon such as ethane or an organic polymer such as vinylidene chloride. Petroleum coke is a typical carbonaceous residue from destructive distillation (carbonization) of petroleum or residues from petroleum cracking. Carbon black and acetylene carbon black are preferred carbon sources.

Any oxide conventionally subjected to a carbothermal synthesis reaction is suitable for purposes of the present invention. The oxide is desirably selected from the group consisting of aluminum oxide, silicon dioxide, titanium dioxide, zirconium oxide, tungsten oxide, molybdenum oxide, boron oxide, chromium oxide, hafnium oxide, niobium oxide, tantalum oxide and vanadium oxide. The oxide is preferably aluminum oxide (alumina) or silicon dioxide (silica).

Binders suitable for purposes of the present invention are products of a condensation reaction between at least one first reactant that has at least one reactive hydroxyl moiety and at least one second reactant having at least one reactive nitrogen-containing moiety. The first reactant is desirably selected from the group consisting of monosaccharides, disaccharides, polysaccharides, starches, modified starches, soy protein, cellulose ethers and cellulose ether derivatives. The second reactant is desirably selected from the group consisting of amines and amides.

The terms "starch" and "modified starch", as used herein, are defined in *Condensed Chemical Dictionary*, Eleventh Edition, Van Nostrand Reinhold Company, Inc.(1987), at pages 1089–90. The definitions are as follows:

Starch (CAS: 9005-84-9), a carbohydrate polymer having the following repeating unit:

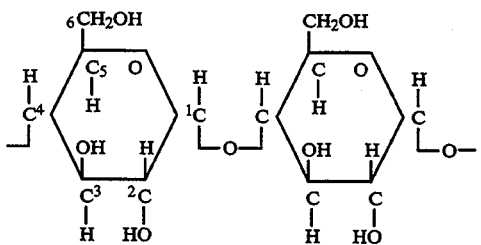

It is composed of about 25% amylose (anhydroglucopyranose units joined by glucosidic bonds) and 75% amylopectin, a branched-chain structure. Properties: White, amorphous, tasteless powder or granules; various crystalline forms may be obtained, including microcrystalline. Irreversible gel formation occurs in hot water; swelling of granules can be induced at room temperature with such compounds as formamide, formic acid, and strong bases and metallic salts. Occurrence: Starch is a reserve polysaccharide in plants (corn, potatoes, tapioca, rice, and wheat are commercial sources).

Starchy modified. Any of several water-soluble polymers derived from a starch (corn potato, tapioca) by acetylation, chlorination, acid hydrolysis, or enzymatic action. These reactions yield starch acetates, esters, and ethers in the form of stable and fluid solutions and films. Modified starches are used as textile sizing agents and paper coatings. Thin-boiling starches have high gel strength, oxidized starches made with sodium hypochlorite have low gelling tendency. Introduction of carboxyl, sulfonate, or sulfate groups into starch gives sodium or ammonium salts of anionic starches, yielding clear, non-gelling dispersions of high viscosity. Cationic starches result from addition of amino groups. The glucose units of starch can be crosslinked with such agents as formaldehyde, soluble metaphosphates, and epichlorohydrin.

The first reactant is preferably selected from the group consisting of sucrose, fructose, glucose, mannose, xylose, raffinose, dextrin, amylose, maltose, lactose, arabinose, dextrose, galactose, amylopectin, glucose polymers (glucans), xylose polymers (xylans), copolymers of glucose and xylose (gluco-xylans), invert sugar, partially invert sugar, molasses from sucrose refining, whey from milk processing, corn syrup, starch, modified starch, methylcellulose, ethylcellulose, hydroxypropylmethylcellulose, hydroxyethylcellulose, sodium carboxymethylcellulose, carboxymethylcellulose and soy protein. The first reactant is more preferably selected from the group consisting of corn starch, wheat starch, sucrose, fructose, soy protein, and cellulose ethers. The group also includes mixtures of two or more members of the group such as a mixture of corn starch, wheat starch and, optionally, a modified corn starch such as an oxidized corn starch commercially available from A. E. Staley Manufacturing Company under the trade designation STAYCO ™ or a substituted corn starch commercially available from A. E. Staley Manufacturing Company under the trade designation ETHYLEX ™ 2025. The first reactant is most preferably selected from the group consisting of mixtures of starches, mixtures of starches and modified starches, sucrose and fructose.

The second reactant is desirably an amine or an amide selected from the group consisting of cyanoguanadine, melamine, urea, hexamethylene tetramine, trimethylamine, diethanolamine, triethanolamine, tetramethylene diamine, acetoguanamine, benzyldimethylamine, methylolmelamine, alkylated methylolmelamine, hexamethoxymethyl melamine, N,N'-dimethyl-p-phenylene diamine, tetraaminobenzene, diaminobenzidine, thiourea, formamide, acetamide, benzamide, oxamide, succinamide, malonamide, guanidine, biuret, triuret, dicyandiamide, biurea, ethylene urea, ammelide, ammeline, aminoguanidine, semicarbazide, thiosemicarbazide and acrylamide. The second reactant is preferably melamine, hexamethylene tetramine, cyanoguanadine or urea.

Nonoxides are conventionally used as nucleating agents for some carbothermal synthesis reactions. The carbothermal synthesis of silicon nitride, for example, typically employs silicon nitride, silicon carbide or silicon oxynitride as a nucleating agent.

The porous aggregates are readily prepared by conventional procedures. The oxide, the carbon source, the optional nonoxide and the first and second reactants used as starting materials are desirably in the form of powders. The oxide, the carbon source and, where used, the nonoxide powders are dry blended using a conventional apparatus such as a ball mill or attrition mill to form a milled mixture. The milled mixture and the first and second reactants are then dry mixed using a conventional apparatus such as a ball mill or a ribbon blender for a period of time sufficient to form a generally uniform dry blend. If desired, the first reactant, the second reactant or both can be ball milled at the same time as the oxide, the carbon source and, where used, the nonoxide powder(s). While ribbon blending continues, water is added to the dry blend in an amount sufficient to form a wet blended mixture. The wet blended mixture desirably has a consistency or viscosity sufficient to allow processing through a conventional apparatus such as an extruder. A single screw, single stage, four inch (10.2 cm) extruder equipped with a die plate having one or more holes of a desired dimension provides satisfactory results, particularly when used in conjunction with a die face cutter. By using such an apparatus, the wet blended mixture is converted into wet pellets.

Wet pellets formed from the wet blended mixture are desirably placed in a container such as a quartz boat. The container and its contents are then placed in an apparatus, such as a tube furnace, and heated, under flowing nitrogen, inert gas or air, preferably nitrogen, to a temperature and maintained at that temperature for a period of time sufficient to dry the pellets and allow a condensation reaction between the first and second reactants to occur. The time and temperature will vary somewhat depending upon size of the wet pellets, their moisture content, choice of first and second reactants and relative amounts of all components of the pellets. When using, for example, a blend of wheat and corn starches as a first reactant and melamine as a second reactant to form wet pellets having a diameter of ¼ inch (0.6 cm) and a length of ⅜ inch (1.0 cm), a temperature of 150° C. Centigrade (°C.) and a time of two hours is sufficient. Longer times are generally needed with lower temperatures. Suitable times and temperatures for other reactants, pellet sizes and component ratios are readily determined without undue experimentation.

After the condensation reaction is substantially complete, the pellets are heated to a higher temperature and maintained at that temperature for a period of time sufficient to calcine the pellets. As used herein, "calcine" means that the pellets are heated under an inert atmosphere, such as that provided by nitrogen or an inert gas such as argon, at a temperature sufficient to decompose components of the binder into a carbonaceous residue and maintained at that temperature until evolution of residual gases effectively ceases. If desired, air could be substituted for inert gas at temperatures below that at which carbon will oxidize. Calcination temperatures typically range from about 250° C. to about 1000° C., preferably from about 300° C. to about 350° C. Continuing the foregoing example, the pellets are heated to a temperature of 330° C. over a period of 30 minutes and maintained at that temperature for a period of two hours. The tube furnace and its contents are then cooled to ambient temperature to yield the porous aggregate of the present invention. As in the case of effecting the condensation reaction, suitable times and temperatures for other reactants, pellet sizes and component ratios are readily determined without undue experimentation.

The following examples illustrate, but do not limit, the present invention. All parts and percentages are by weight unless otherwise stated.

EXAMPLE 1

Preparation of Silicon Nitride Precursor Pellets and Conversion Thereof to Silicon Nitride Preparation and Testing of Precursor Pellets Acetylene carbon black (SHAWINIGAN ™, Chevron Co.) in an amount of 33.3 parts, 41.7 parts of silica (HP-70, Feldspar Corp.) and 25 parts silicon nitride (SN E10, Ube Industries) are placed in a ball mill containing flint media and mixed for four hours to form an intimate dry mixture. All parts are based upon total dry mixture weight.

An amount (52.7 parts) of the dry mixture is placed in a ribbon blender together with 4.4 parts wheat starch (GENVIS ™ 700, Ogilvie Mills Co.), 1.8 parts corn starch (powdered grade 670, Hubinger Co.), and 3.1 parts melamine (AERO ™, American Cyanamid Co.) and dry blended for 20 minutes. An amount (38 parts) of water is then added to the ribbon blender and blending continues for another 20 minutes to form a wet blend.

The wet blend is transferred to the feed hopper of an extruder and extruded through a ¼ inch (0.6 cm) diameter hole in a die plate. The extrudate is cut into pellets having a length of about ⅜ inch (1.0 cm).

The pellets are placed in a quartz boat that is inserted into a tube furnace through which gaseous nitrogen is flowing. The temperature of the furnace and its contents is raised to about 150° C. over a period of 30 minutes and maintained at that temperature for about two hours to effect condensation polymerization between the starches and the melamine. The tube furnace and its contents are then heated to a temperature of 330° C. over a period of 30 minutes and maintained at 330° C. for about two hours to calcine the pellets. The tube furnace and its contents are then cooled to ambient temperature (about 23° C.) after which the pellets are removed from the furnace.

Fifty calcined pellets are tested for single pellet radial crush strength in a manner similar to that described for formed catalyst shapes according to ASTM Standard D 4179-82. A Tablet Test Instrument Model PTB 311 (Scientific Instruments & Technology Corp., Englishtown, N.J.) is used as a test apparatus. The apparatus has a lower detection limit of 15 Newtons (N). The pellets have an average radial crush strength of 54.0±22.0N. The crushed pellets are analyzed for internal porosity and pore size distribution using a 9310 Micromeritics Mercury Intrusion Porosimeter. The pellets have a total intrusion volume of about 0.58 cc/g and a median pore diameter(volume) of approximately 0.19 micrometers ($\mu$m).

Conversion of Calcined Pellets to a Finished Reaction Product

An amount (9.49 g) of uncrushed calcined pellets are placed in a graphite crucible furnace equipped with a distributor plate for dispersing inlet nitrogen feed gas. Nitrogen feed gas distributed via the distributor plate flows at a rate of approximately 5.7 standard liters per minute (slm) through the pellets contained in the crucible. The furnace and its contents are brought to a temperature of 1480° C., maintained there for approximately 5 hours to convert the calcined pellets to raw, reacted pellets and then cooled to ambient temperature. The raw, reacted pellets weigh 6.42 grams. The furnace appears to be free of any powder resulting from breakdown of the pellets during reaction.

The raw, reacted pellets are placed in a quartz crucible that is inserted into a tube furnace. A 50/50, based upon volume, mixture of air and nitrogen flows over the crucible in the tube furnace. The tube furnace and its contents are heated to a temperature of 800° C. and maintained there for about 2 hours to "burn out" or remove excess unreacted carbon from the raw pellets. After cooling to ambient temperature, the burned out or finished pellets are removed from the furnace. The finished pellets, while intact, crush readily into a product powder. The finished pellets weigh about 15.5 % less than the raw pellets. The lower weight results from removal of unreacted carbon via conversion to carbon dioxide.

The product powder is light green in color and, by x-ray diffraction analysis contains greater than 95% alpha phase $Si_3N_4$. It has a BET surface area of about 7.1 m²/g. Analysis using LECO analyzers reveals a carbon content of 0.37 % and a monatomic oxygen content of 1.39%.

This example demonstrates that the condensation polymerization of a mixture of corn and wheat starches with melamine yields a binder that imparts a significant resistance to crushing prior to and during a carbothermal reduction reaction. It also demonstrates that the binder allows production of a product pellet that is readily crushed into a product powder of high purity.

By way of contrast, if the binder constitutes only the starches or the melamine rather than the condensation reaction product, calcination yields pellets having an average radial crush strength of less than 20N. In fact, more than ½ of the pellets fail to register a radial crush strength equal to the lower detection limit of 15N.

EXAMPLE 2

Preparation of Silicon Nitride Precursor Pellets With Early Addition of Melamine Example 1 is duplicated through the preparation and testing of precursor pellets save for adding the melamine before, rather than after, ball milling. The calcined pellets have an average radial crush strength of 93.7±31.1N. This example demonstrates a more intimate dispersion of the melamine results in a more crush resistant precursor pellet.

EXAMPLE 3

Preparation of Hollow Silicon Nitride Precursor Pellets

Example 2 is duplicated save for modifying the die plate of the extruder to provide hollow pellets having an outside diameter (O.D.) of 11/32 inch (0.87 cm) and an inside diameter (I.D.) of ⅛ inch (0.32 cm). The calcined pellets have an average radial crush strength of 32.1±9.1N. This example demonstrates that hollow precursor pellets having an average radial crush strength of >20N can be prepared using the condensation reaction product of the present invention as a binder.

EXAMPLES 4-6

Preparation of Silicon Nitride Precursor Pellets with Varying Melamine Contents

The ball milling portion of Example 2 is replicated with three different melamine contents: 1% (Example 4); 4.8% (Example 5); and 16.7% (Example 6). For each example, 26.1 parts of the dry milled mixture are added to a stirred flask that contains 61.6 parts of water, 8.8 parts of TRITON ™ X-100 dispersant (an alkylphenoxy polyethoxy ethanol commercially available from Rohm & Haas Co.) and 3.5 parts of ANTIFOAM ™ B (a silicone compound commercially available from Dow Corning Corporation) to form a slurry. All parts are based upon slurry weight. After being stirred for about 30 minutes, the slurry is added to a ball jar and ball milled for 4 hours to yield a "wet" ball milled slurry.

The wet ball milled slurry is poured into a pan, placed in an air convection oven maintained at 150° C. and dried overnight. The dried slurry is then separated from the milling media and placed in a quartz mortar. Wheat starch and corn starch are added to the mortar to provide a powder composition of having 50 parts dried slurry, 3.9 parts wheat starchy and 1.7 parts corn starch. The powder composition is intimately blended with a quartz pestle. Then, 44.4 parts of water are added to the mortar and worked into the powder composition with the pestle. All parts are based upon total weight of the mortar contents.

The mortar contents are added to the feed hopper of a laboratory size extruder and extruded into wet pellets as in Example 1. The wet pellets are dried and calcined as in Example 1 save for increasing the calcining temperature to 340° C. and the calcining time to 3 hours.

The pellets are tested for average radial crush strength and internal porosity as in Example 1. The results are shown in Table I.

TABLE I

| Example Number | Average Radial Crush Strength (N) | Total Intrusion (cc/g) | Median Pore Diameter (Volume) (μm) |
|---|---|---|---|
| 4 | 22.8 | 0.34 | 0.13 |
| 5 | 54.1 | 0.58 | 0.19 |
| 6 | 64.2 | 0.76 | 0.73 |

The data presented in Table I demonstrate that melamine provides satisfactory results with amounts as low as 1%, based upon total composition weight. An increase in melamine content, relative to total starch content, yields concurrent increases in all properties shown in Table I.

Examples 7-11

Preparation of Silicon Nitride Precursor Pellets with Varying Carbon, Silica and Silicon Nitride Contents, but Constant Starch and Melamine Contents The procedure of Examples 4-6 is replicated save for holding the amount wheat starch at 7 parts, the amount of corn starch at 3 parts and the amount of melamine at 2.6 parts while varying the amounts of carbon, silica and silicon nitride needed to total 87.4 parts. The amounts of all components total 100 parts for each example. The amounts of the varying components and the average radial crush strength for each example are shown in Table II.

TABLE II

| Example Number | Components (Parts by weight) | | | Average Radial Crush Strength (N) |
|---|---|---|---|---|
| | C | SiO$_2$ | Si$_3$N$_4$ | |
| 7 | 29.1 | 36.4 | 21.9 | 41.3 |
| 8 | 29.1 | 29.2 | 29.1 | 43.9 |
| 9 | 29.1 | 48.6 | 9.7 | 31.1 |
| 10 | 39.7 | 39.7 | 8.0 | 22.5 |
| 11 | 20.2 | 33.6 | 33.6 | 49.7 |

The data presented in Table II demonstrate that satisfactory crush strengths are readily attainable with a variety of composition component ratios. Similar results are expected with other variations of these components.

Examples 12-17

Preparation of Silicon Nitride Precursor Pellets Using Sucrose as a Substitute for Starch A series of dry ball milled mixtures of 36 parts of acetylene carbon black, 45 parts of silica, 10 parts of sucrose (confectioner's sugar), and 9 parts of silicon nitride is prepared as in Example 1. The sources of carbon black, silica and silicon nitride are the same as those of Example 1.

An amount of melamine is dry blended into 100 parts of each dry ball milled mixture using the mortar and pestle procedure described in Examples 4-6. An amount of water is then worked into the resulting dry blends to form corresponding wet mixtures. Each wet mixture is then extruded as in Example 1 into wet pellets having a diameter of ¼ inch (0.6 cm) and a length of ½ inch (1.3 cm). The pellets are dried overnight at 150° C. and calcined in a nitrogen atmosphere for 3 hours at 330° C. The amounts of melamine and water, the ratio of melamine to sucrose and the average radial crush strength of calcined pellets for Examples 12-17 are shown in Table III.

TABLE III

| Example Number | Melamine (parts) | Water (parts) | Melamine to Sucrose (Weight Ratio) | Average Radial Crush Strength (N) |
|---|---|---|---|---|
| 12 | 1 | 40 | 1/10 | 43.8 |
| 13 | 2.5 | 41 | 2.5/10 | 73.4 |
| 14 | 5 | 45 | 5/10 | 68.1 |
| 15 | 10 | 41 | 10/10 | 88.2 |
| 16 | 15 | 47 | 15/10 | 85.3 |
| 17 | 20 | 27 | 20/10 | 112.1 |

The data presented in Table III demonstrates that sucrose is an effective substitute for starch or a mixture of starches in preparing a condensation reaction product for use as a binder. As with starch, an increase in melamine content leads to a corresponding increase in average radial crush strength.

EXAMPLES 18-24

Preparation of Silicon Nitride Precursor Pellets Using a Blend of Starch and Sucrose and Varying Sources of Silica The procedure of Examples 12-17 is replicated using 48.2 parts of silica, 31.8 parts of carbon black (MONARCH TM, Cabot Corp.), 10.0 parts melamine, 5.0 parts sucrose, 2.5 parts wheat starch, 2.5 parts corn starch and sufficient water to attain a desirable consistency. The desirable consistency is sufficient to allow the wet mixtures to be extruded using a one inch (2.5 cm) extruder into wet pellets that do not contain so much moisture that they slump (collapse or lose their shape) or so little moisture that they readily crumble apart with little or no applied pressure. The silica sources are: A—the silica used in Examples 1-17; B—EMS 960 MICROSILICA TM (Elkem Co.); C—CABOSIL TM MS-7, a fumed silica (Cabot Corp.); D—MINUSIL TM -5 (U.S. Silica Co.); E—MINUSIL TM -10, (U.S. Silica Co.); F—35M, a colloidal silica (Crosfield Co.); and G—400 Mesh (Tyler Equivalent) (38 μm sieve opening) flint (Central Silica Co.). Table IV shows the silica source, average radial crush strength, total intrusion and median pore diameter of the resultant pellets.

TABLE IV

| Example Number | SiO2 Source | Average Radial Crush Strength (N) | Total Intrusion (cc/g) | Median Pore Diameter (Volume) (μm) |
|---|---|---|---|---|
| 18 | A | 79.6 | 0.26 | 0.079 |
| 19 | B | 104.9 | — | — |
| 20 | C | 51.8 | 0.34 | 0.024 |
| 21 | D | 126.9 | 0.32 | 0.096 |
| 22 | E | 171.4 | 0.28 | 0.094 |
| 23 | F | 36.5 | — | — |
| 24 | G | 196.4 | — | — |

— Means not measured

The data presented in Table IV demonstrate that the source of silica has a significant influence upon the measured properties. It is believed that this is due, at least in party to bulk density or packing density of the silica. Examples 20 and 23 have the lowest bulk density values as well as the lowest average radial crush strength values. The data also show that blends of sucrose and starch yield effective condensation polymerization products for use as binders. By way of contrast, if sucrose and starch are blended in the absence of melamine, the resulting pellets have an average radial crush strength of less than 20N.

EXAMPLES 25-29

Preparation of Aluminum Nitride Precursor Pellets Using Wheat Starch, Corn Starch or a Blend of Wheat and Corn Starches A series of dry milled mixtures is prepared by ball milling, as in Example 1 save for using alumina milling media rather than flint milling media, 61.2 parts of alumina (A16 SG, commercially available from Aluminum Company of America), 23.8 parts of acetylene carbon black, 10.0 parts of starch and 5.0 parts of melamine. Each dry milled mixture is transferred to a ribbon blender as in Example 1 and blended with sufficient water to form an extrudable wet blend as in Examples 18-24. The wet blend is extruded into pellets as in Example 1. The wet pellets are dried and calcined in the same tube furnace as in Example 1 using a revised heating schedule. Under the revised schedule, the tube furnace and its contents are heated from ambient temperature to 150° C. in 15 minutes, held at 150° C. for 15 minutes, then heated from 150° C. to 330° C. in 60 minutes, held at 330° C. for 3 hours and thereafter cooled back to ambient temperature. Table V shows the type and amount of starch, average radial crush strength of dried pellets, average radial crush strength of calcined pellets, total intrusion and median pore diameter of the resultant pellets.

TABLE V

| Example Number | Starch (parts) Wheat | Starch (parts) Corn | Dried Average Radial Crush Strength (N) | Calcined Average Radial Crush Strength (N) | Total Intrusion (cc/g) | Median Pore Diameter (Volume) (μm) |
|---|---|---|---|---|---|---|
| 25 | 0.0 | 10.0 | 181.1 | 126.0 | 0.25 | 0.049 |
| 26 | 3.0 | 7.0 | 210.4 | 92.9 | 0.19 | 0.057 |
| 27 | 5.0 | 5.0 | 258.4 | 126.7 | 0.27 | 0.053 |
| 28 | 7.0 | 3.0 | 303.9 | 135.7 | 0.18 | 0.051 |
| 29 | 10.0 | 0.0 | 154.2 | 56.7 | 0.17 | 0.056 |

The data presented in Table V demonstrate that aluminum nitride precursor pellets can be prepared in the same manner as silicon nitride precursor pellets. The data also demonstrate that the type and relative amount of starch have an effect upon average radial crush strength, total intrusion and median pore diameter. The data further demonstrate that dried pellets have significantly higher average radial crush strength than their calcined counterparts. As such, the dried pellets could be used in place of their calcined counterparts provided steps are taken to remove volatile materials coming off the dried pellets during processing or procedures are added to account for calcining in situ as pellets are heated to process temperatures. In addition, some modification of the reactor may be necessary.

EXAMPLES 30-34

Preparation of Aluminum Nitride Precursor Pellets at Varying Calcination Temperatures A precursor mixture having the same composition as Example 28 is converted to wet pellets using the procedure of Example 1 wherein the starches are added during ribbon blending rather than during ball milling as in Example 28. The wet pellets are dried and calcined at 330° C. as in Example 1. This is Example 30.

For Example 31, about 100 calcined pellets are returned to the tube furnace under flowing nitrogen. The temperature is ramped from ambient to 350° C. in 30 minutes and held there for two hours before cooling back to ambient. Examples 32-34 follow the procedure for Example 31 save for respective increases in temperature to 500° C. 600° C. and 800° C. Table VI shows the calcination temperature, average radial crush strength after calcination of the dried pellets, total intrusion and median pore diameter of the resultant pellets.

TABLE VI

| Example Number | Calcining Temp. (°C.) | Calcined Average Radial Crush Strength (N) | Median Total Intrusion (cc/g) | Pore Diameter (Volume) ($\mu$m) |
| --- | --- | --- | --- | --- |
| 30 | 330 | 88.8 | 0.30 | 0.080 |
| 31 | 350 | 81.9 | 0.32 | 0.080 |
| 32 | 500 | 59.1 | 0.32 | 0.082 |
| 33 | 600 | 58.1 | 0.36 | 0.083 |
| 34 | 800 | 73.4 | 0.33 | 0.084 |

The data in Table VI show that desirable properties, particularly an average radial crush strength in excess of 20N, are readily attainable at calcination temperatures as high as 800° C. Such temperatures are not, however, necessary as shown by the results for Example 30.

By way of contrast, calcination without exposing the pellets to elevated temperatures for a period of time sufficient to dry the pellets and effect the condensation reaction typically produces calcined pellets with average radial crush strengths of less than 20N. An extended drying time is not needed if heating to calcination temperatures (e.g. 330°-400° C.) occurs at a rate that is low enough to allow the condensation reaction to occur prior to appreciable calcination. A suitable heating rate is less than about 10° C./minute. The heating rate is desirably less than about 7° C./minute, preferably from about 1 to about 6° C./minute. Heating rates of less than 1° C./minute, while feasible, may not be economically practical.

EXAMPLES 35-39

Preparation of Aluminum Nitride Precursor Pellets Using Sucrose and Varying Amounts of Melamine A dry ball milled mixture of 65.4 parts of alumina, 24.6 parts acetylene carbon black and 10 parts sucrose is prepared as in Example 1. Sources of the alumina, acetylene carbon black and sucrose are the same as in preceding examples. The mixture is divided into five equal lots, one for each of Examples 35-39. An amount of melamine is added to each lot. The amounts are shown in Table VII. Each lot is then dry ball milled an additional two hours. Each lot is then ribbon blended with sufficient water, as in Examples 18-24, to form a wet blended mixture of extrudable consistency. Each mixture is converted into calcined pellets as in Example 1 using a calcining temperature of 330° C. Table VII also shows average radial crush strength, total intrusion and median pore diameter.

TABLE VII

| Example Number | Melamine (parts) | Average Radial Crush Strength (N) | Total Intrusion (cc/g) | Median Pore Diameter (Volume) ($\mu$m) |
| --- | --- | --- | --- | --- |
| 35 | 2.5 | 88.0 | 0.19 | 0.039 |
| 36 | 5.0 | 150.3 | 0.20 | 0.041 |
| 37 | 10.0 | 226.7 | 0.21 | 0.042 |
| 38 | 15.0 | 274.3 | 0.22 | 0.046 |
| 39 | 20.0 | 272.0 | 0.25 | 0.053 |

The data presented in Table VII show that, as with silicon nitride precursor pellets, an increase in melamine content yields a concurrent increase in average radial crush strength, total intrusion and median pore diameter.

If a mixture of 7 parts wheat starch and 3 parts corn starch is substituted for the sucrose and the calcining temperature is reduced to 330° C., the resultant pellets exhibit similar results to those shown in Table VII. All pellets have average radial crush strengths in excess of 20N. Similar results are expected with other substitutions of second reactants in preparing condensation products for use as binders. Other suitable second reactants are disclosed hereinabove.

EXAMPLES 40-48

Preparation of Aluminum Nitride Precursor Pellets Using Various Aluminas, Mixtures of Starches and Cyanoguanadine The procedure of Examples 25-29 is replicated, save for increasing the calcining temperature to 340° C., for mixtures of 61.8 parts of alumina, 23.2 parts of carbon black (THERMAX TM ULTRA PURE, commercially available from R. T. Vanderbilt Co.), 7.0 parts of wheat starch, 3.0 parts of corn starch and 5.0 parts of cyanoguanadine. The alumina sources are: A—the alumina used in Examples 25-29; B—A16 UG, commercially available from Aluminum Company of America; C—A13 UG, commercially available from Aluminum Company of America; D—A17, commercially available from Aluminum Company of America; E—HPA-0.5 X, commercially available from Ceralox Corp.; F—BAIKALOX TM CR15, commercially available from Baikowski International Corp.; G—MARTOXID TM CS-400, commercially available from Lonza, Inc.; H—DISPERAL TM B, commercially available from Condea Chemie; and I—MARTINOL TM OL-111/LE, commercially available from Lonza, Inc. Table VIII shows the alumina source, average radial crush strength, total intrusion and median pore diameter of the resultant pellets.

TABLE VIII

| Example Number | Al$_2$O$_3$ Source | Average Radial Crush Strength (N) | Total Intrusion (cc/g) | Median Pore Diameter (Volume) ($\mu$m) |
| --- | --- | --- | --- | --- |
| 40 | A | 34.2 | 0.24 | 0.094 |
| 41 | B | 63.8 | 0.31 | 0.19 |
| 42 | C | 62.4 | 0.36 | 0.17 |
| 43 | D | 103.1 | 0.38 | 0.051 |
| 44 | E | 58.7 | — | — |

TABLE VIII-continued

| Example Number | Al₂O₃ Source | Average Radial Crush Strength (N) | Total Intrusion (cc/g) | Median Pore Diameter (Volume) (μm) |
|---|---|---|---|---|
| 45 | F | 83.1 | — | — |
| 46 | G | 84.3 | — | — |
| 47 | H | 36.9 | — | — |
| 48 | I | 21.9 | — | — |

—Means not measured

The data in Table VIII demonstrate that the source of alumina, like the source of silica (Examples 18–24), has a significant effect upon properties such as average radial crush strength. As with silica, this may be due to packing density, with higher packing densities yielding higher crush strengths than lower packing densities. The data also show that cyanoguanadine is an effective substitute for melamine in preparing condensation reaction products for use as a binder. All examples have an average radial crush strength in excess of 20N. Even though they are not measured for Examples 44–48, the total intrusion and median pore diameter for each of those examples is believed to be acceptable.

EXAMPLES 49-54

Preparation of Aluminum Nitride Precursor Pellets Using Starch and Varying Amounts of Cyanoguanadine The procedure of Examples 35-39 is replicated, save for increasing the number of lots from 5 to 6 and the calcining temperature to 350° C. for a mixture of 65.4 parts of alumina (Source D), 24.6 parts carbon black, 5 parts wheat starch and 5 parts corn starch. The carbon black, corn starch and wheat starch are the same as those used in Examples 40-48. Table IX shows the amount of cyanoguanadine as well as the average radial crush strength, total intrusion and median pore diameter for each lot of pellets.

TABLE IX

| Example Number | Cyanoguanadine (parts) | Average Radial Crush Strength (N) | Total Intrusion (cc/g) | Median Pore Diameter (Volume) (μm) |
|---|---|---|---|---|
| 49 | 1 | 28.3 | 0.20 | 0.11 |
| 50 | 2.5 | 58.1 | 0.18 | 0.11 |
| 51 | 5.0 | 110.2 | 0.17 | 0.13 |
| 52 | 10.0 | 146.9 | 0.20 | 1.1 |
| 53 | 15.0 | 222.4 | 0.21 | 0.81 |
| 54 | 20.0 | 215.7 | 0.26 | 1.92 |

Similar results are obtained by substituting melamine for cyanoguanadine and increasing the wheat starch to 7 parts while decreasing the corn starch to 3 parts. In both cases, increases in nitrogen-containing moiety content (cyanoguanadine or melamine, relative to the amount of starch, lead to increases in values for average radial crush strength, total intrusion and median pore diameter. All lots yield average radial crush strengths in excess of 20N.

EXAMPLES 55-60

Preparation of Aluminum Nitride Precursor Pellets Using Varying Carbon Sources, Starch Mixtures as a First Reactant and Urea as a Second Reactant The procedure of Examples 49-54 is replicated for mixtures of 58.2 parts of alumina (Source D, Examples 40–48), 21.8 parts of carbon, 10.0 parts of urea, 5.0 parts of wheat starch and 5.0 parts of corn starch. The sources of carbon are: A—the carbon black used in Examples 18-24; B—the acetylene carbon black used in Example 1; C—ELFTEX ™ 5, commercially available from Cabot Corp.; D—the carbon black used in Examples 49-54; E—REGAL ™ 300 R, commercially available from Cabot Corp.; and F—ELFTEX ™ 12, commercially available from Cabot Corp. Table X shows the alumina source, average radial crush strength, total intrusion and median pore diameter of the resultant pellets.

TABLE X

| Example Number | Carbon Source | Average Radial Crush Strength (N) | Total Intrusion (cc/g) | Median Pore Diameter (Volume) (μm) |
|---|---|---|---|---|
| 55 | A | 30.6 | 0.21 | 0.079 |
| 56 | B | 38.8 | 0.28 | 0.070 |
| 57 | C | 26.5 | — | — |
| 58 | D | 127.9 | 0.20 | 0.20 |
| 59 | E | 32.5 | — | — |
| 60 | F | 29.4 | — | — |

—Means not measured

The data in Table X demonstrate that the source of carbon has a significant influence upon physical properties of the resultant precursor pellets. As with other raw materials, packing density of the carbon source is believed to be a major contributing factor to differences in physical properties. The data also demonstrate that urea is a satisfactory second reactant for preparation of a condensation reaction product that is to be used as a binder.

EXAMPLES 61-65

Preparation of Aluminum Nitride Precursor Pellets Using Starch and Varying Amounts of Urea The procedure of Examples 35-39 is replicated for a mixture of 65.4 parts of alumina (Source D), 24.6 parts carbon black (Source D), 5 parts wheat starch and 5 parts corn starch. The corn starch and wheat starch are the same as those used in Examples 40-48. Table XI shows the amount of urea as well as the average radial crush strength for each lot of pellets.

TABLE XI

| Example Number | Urea (parts) | Average Radial Crush Strength (N) |
|---|---|---|
| 61* | 0 | 20 |
| 62 | 2.5 | 31.7 |
| 63 | 5 | 29.9 |
| 64 | 10 | 63.5 |
| 65 | 20 | 96.0 |

*means not an example of the invention

As with melamine and cyanoguanadine, increasing amounts of urea, relative to the amount of starch, generally lead to increases in values for average radial crush strength. Similar increases in total intrusion and median pore diameter are expected. All lots, save for that of Example 61* which contains no urea, yield average radial crush strengths in excess of 20N. The decrease in crush strength from Example 62 to 63 may be due to any one of a number of causes such as experimental error or inadequate mixing. Irrespective of the cause, the resultant pellets in Example 63 have satisfactory properties. Similar results are obtained when cyanuric acid is substituted for urea.

EXAMPLES 66–69

Preparation of Aluminum Nitride Precursor Pellets Using Sucrose as a First Reactant and Hexamethylene Tetramine as a Second Reactant Examples 66–69 replicate Examples 35–39 with the same ingredients, save for substituting hexamethylene tetramine for melamine, and ingredient ratios. Table XII shows the average radial crush strength, total intrusion and median pore diameter of resultant pellets.

TABLE XII

| Example Number | Hexamethylene (parts) | Average Radial Crush Strength (N) | Total Intrusion (cc/g) | Median Pore Diameter (Volume) (μm) |
|---|---|---|---|---|
| 66 | 1 | 38.3 | 0.20 | 0.038 |
| 67 | 5 | 37.2 | 0.22 | 0.043 |
| 68 | 10 | 55.4 | 0.22 | 0.047 |
| 69 | 20 | 42.8 | 0.22 | 0.051 |

—Means not measured

The data in Table XII demonstrate the suitability of condensation reaction products formed from sucrose and hexamethylene tetramine as binders for aluminum nitride precursors. Similar results are expected with other component ratios and, taking into account individual component variations such as bulk density, other sources of such components. As with Example 63, the decreases in average crush strength for Examples 67 and 69 relative, respectively, to Examples 66 and 68, may be due to inadequate mixing or some other factor. That does not, however, diminish their suitability for purposes of the present invention.

Examples 70 and 71

Preparation of Aluminum Nitride Precursor Pellets Using Methylcellulose or Fructose as a First Reactant and Cyanoguanadine as a Second Reactant A mixture of 69 parts of alumina, 26 parts of acetylene carbon black and 5 parts of cyanoguanadine is dry ball milled for four hours as in Example 25 to form a premixed blend. The alumina and carbon black are the same as those used in Examples 66–69. The premixed blend is divided into four lots. Each lot is then dry ball milled for an additional two hours with 10 parts of a hydroxyl moiety contributor per 100 parts of premixed blend. The hydroxyl moiety contributors for Examples 70 and 71 are, respectively, METHOCEL TM, a cellulose ether commercially available from The Dow Chemical Company, and fructose (Estee Corp.). The resultant dry ball milled mixtures are then converted into calcined pellets using the procedure of Examples 25–29 and evaluated for physical properties, also as in Examples 25–29. The average radial crush strengths for Examples 70 and 71 are, respectively, 22N and 201N.

The foregoing crush strength data demonstrate that cellulose ethers, such as METHOCEL TM, and fructose are suitable hydroxyl moiety contributors. In other words, they may be used as a first reactant in preparing condensation reaction products used as binders to prepare crush-resistant porous aggregates. Similar results are expected with other hydroxyl moiety contributors and, taking into account variations due to component sources, other components, all of which are disclosed herein.

EXAMPLES 72–77

Preparation of Aluminum Nitride Precursor Pellets Using Different Starches as a First Reactant and Melamine as a Second Reactant The procedure of Examples 25–29 is replicated for mixtures of 57.6 of alumina, 22.4 parts of acetylene carbon black, 10 parts of melamine, and 10 parts of starch. The alumina, acetylene carbon black and melamine are the same as those used in Examples 25–29. The starches and their corresponding average radial crush strengths are as follows: (a) wheat starch—47 N; (b) corn starch—89N; (c) a cationic potato starch commercially available under the trade designation STA-LOK TM 400 from A. E. Staley Manufacturing Company Manufacturing Company—81N; (d) a pregelatinized cationic potato starch commercially available under the trade designation STA-LOK TM 500 from A. E. Staley Manufacturing Company—54N; (e) a hydroxyethyl derivative of corn starch commercially available under the trade designation ETHYLEX TM 2025 from A. E. Staley Manufacturing Company—115N; and (f) an oxidized corn starch commercially available under the trade designation STAYCO TM C from A. E. Staley Manufacturing Company—137N.

The data presented in Examples 72–77 shows that a variety of starches are suitable for use in preparing condensation reaction products used as binders to prepare crush-resistant porous aggregates. Similar results are expected with other starches and, taking into account variations due to component sources, other components, all of which are disclosed herein.

EXAMPLES 78–84

Preparation of Aluminum Nitride Precursor Pellets Using One or More Starches as a First Reactant and Melamine as a Second Reactant The procedure of Examples 72–77 is replicated for mixtures of 58.5 of alumina, 22.75 parts of acetylene carbon black, 6.24 parts of melamine, and 12.51 parts of starch. The alumina, acetylene carbon black and melamine are the same as those used in Examples 72–77. In addition, the starches, hereinafter designated A, B and C, are the same as (a), (b) and (f) in Examples 72–77. The proportional amounts of starch and resultant crush strengths are shown in Table XIII.

TABLE XIII

| Example Number | Starch (Parts by Weight) | | | Average Radial Crush Strength (N) |
|---|---|---|---|---|
| | A | B | C | |
| 78 | 8.76 | 3.75 | 0 | 60.1 |
| 79 | 7.88 | 3.38 | 1.25 | 53.7 |
| 80 | 6.57 | 2.81 | 3.13 | 61.5 |
| 81 | 4.38 | 1.88 | 6.25 | 95.6 |
| 82 | 2.19 | 0.94 | 9.38 | 80.0 |
| 83 | 0 | 0 | 12.51 | 50.8 |
| 84 | 8.76 | 0 | 3.75 | 40.2 |

The data in Table XIII demonstrate that some mixtures of three starches provide higher average radial crush strengths than any of the starches taken alone or in combination with one other starch. Similar results are expected with other starches as well as with other first reactants, such as carbohydrates, second reactants and other aggregate components, all of which are disclosed herein.

EXAMPLES 85–87

Preparation of Aluminum Nitride Precursor Pellets Using Soy Protein as a First Reactant and Melamine as a Second Reactant The procedure of Examples 72–77 is replicated for mixtures of 72 parts of alumina and 28 parts of acetylene carbon black as a precursor mixture. Varying amounts of the precursor mixture are blended with varying amounts of melamine and 10 parts of a soy protein, commercially available under the trade designation PROMAX ™ DS from Central Soya, Chemurgy Division. The alumina, acetylene carbon black and melamine are the same as those used in Examples 72–77. The amounts of precursor mixture and melamine and the average radial crush strength of resultant pellets are shown in Table XIV. In the absence of melamine, the resultant pellets have an average radial crush strength of less than 20N.

TABLE XIV

| Example Number | Precursor Mixture (Parts) | Melamine (Parts) | Average Radial Crush Strength (N) |
|---|---|---|---|
| 85 | 89 | 1 | 23.2 |
| 86 | 87.5 | 2.5 | 38.2 |
| 87 | 85 | 5 | 83.4 |

The data presented in Table XIV demonstrate that soy protein is an acceptable first reactant in place of starch, modified starch, mixtures of starches (some of which may be modified), sucrose or other first reactants. Increasing the melamine content for a constant amount of soy protein leads to a corresponding increase in average radial crush strength. Similar results are expected with other starches as well as with other aggregate components, all of which are disclosed herein. Improvements in total intrusion and median pore diameter are also expected.

EXAMPLE 88

Preparation of Zirconium Nitride Precursor Pellets Using Starch as a First Reactant and Melamine as a Second Reactant A combination of 20.8 parts of the same acetylene carbon black as in Example 25, 64.8 parts zirconia (TSK, Toyo Soda Co.), 4.8 parts wheat starch, 4.8 parts corn starch and 4.8 parts melamine is dry ball milled for 4 hours in a ball mill containing zirconia media. A mortar and pestle is used to form a wet mixture of 100 parts of the dry ball milled combination with 46 parts of water. The wet mixture is extruded into ¼ inch (0.6 cm) by ½ inch (1.3 cm) wet pellets that are dried overnight at 150° C. and then calcined in flowing nitrogen at 330° C. for 3 hours in a tube furnace in a manner similar to that used in Example 25. The resultant pellets have an average radial crush strength of 95.7N.

EXAMPLES 89

Preparation of Titanium Nitride Precursor Pellets Using Starch as a First Reactant and Melamine as a Second Reactant The procedure of Example 88 is replicated with some modifications for a combination of 57.2 parts of titania (Fisher Scientific), 28.4 parts of acetylene carbon black and the same amounts of starches and melamine. The modifications are using alumina media in place of zirconia media and increasing the amount of water from 46 parts to 64 parts. The resultant pellets have an average radial crush strength of 29.3N.

EXAMPLES 90

Preparation of Titanium Diboride Precursor Pellets Using Starch as a First Reactant and Melamine as a Second Reactant The procedure of Example 89 is replicated save for reducing the amount of titania to 53.8 parts and the amount of carbon black to 13.3 parts, adding 18.5 parts of boron carbide (ESK ™ 1500, Elektroschmelzwerk Kempten GmbH) and using the same amount of water as in Example 88. The resultant pellets have an average radial crush strength of 112.1N.

EXAMPLES 91

Conversion of Precursor Pellets to Silicon Nitride Product Using a Rotary Reactor Calcined hollow precursor pellets are prepared as in Example 3 save for reducing the outside diameter of the pellets to 9/32 inch ((0.7 cm). A rotary induction furnace having a modified 9 inch (22.9 cm) internal diameter graphite crucible rotating at 6 revolutions per minute (rpm) is used to convert a 500 g quantity of the precursor pellets into silicon nitride product pellets. The crucible modification consists of 6 equally spaced, ½ inch (1.3 cm) high graphite lifts that are attached to the inside of the crucible to aid in mixing crucible contents. The conversion takes place by exposing the crucible contents to a heat treatment at a temperature of 1525° C. for 3 hours in the presence of flowing nitrogen (40 standard liters per minute (slm) flow rate).

Following the heat treatment, the crucible and its contents are cooled to ambient temperature (23° C.). The contents (silicon nitride product pellets) weigh 329.4 g of which 0.3 g (0.1 weight percent (wt-%)) pass through a 7 mesh (Tyler Equivalent Designation) (2.80 mm sieve opening) screen. Substantially all of the product pellets are intact.

Prior to removal of excess carbon, the product pellets have an oxygen content, as determined using a LECO oxygen analyzer, of 1.2 wt-% monatomic oxygen. After removal of excess carbon via a 3 hour heat treatment at 800° C. in a flowing 50/50 (volume ratio) air/nitrogen atmosphere, the monatomic oxygen content is 0.97 wt-%. X-ray diffraction analysis of the product after removal of excess carbon shows that it contains about 97 wt-% α-phase $Si_3N_4$. Scanning electron microscopy (SEM) of the product after removal of excess carbon shows that it is composed of equiaxed particles that have an average size of about 0.2 micrometers (μm).

Duplicating this procedure with solid precursor pellets having a size of ¼ inch (0.6 cm) by ½ inch (1.3 cm) and an increased heat treatment time of 280 minutes at lower temperature of 1500° C. yields 310.0 g of product pellets. About 0.2 wt-% of the product passes through the 7 mesh screen. Product from the solid precursor pellets has α-phase and carbon contents similar to that resulting from the hollow precursor pellets.

This example demonstrates that precursor pellets, which are prepared by a procedure wherein melamine and starch undergo a condensation reaction to form a binder, have sufficient strength or integrity to prevent breakdown of the pellets during reaction for an extended time in a rotary reactor. This result follows irrespective of whether the precursor pellets are hollow or solid. By way of contrast, duplication of this example without melamine yields a substantial increase, up to about 3.5 wt-%, in the amount of product that passes through a 7 mesh screen. Similar results are expected with other binder component combinations and other reactants, all of which are disclosed herein.

EXAMPLE 92

Conversion of Precursor Pellets to Aluminum Nitride Product Using a Fluid Bed Reactor Calcined precursor pellets are prepared in accordance with the procedure of Examples 49–54 for a mixture of 65.4 parts of alumina (Source A), 24.6 parts of the same acetylene carbon black as in Examples 25–29, 7.0 parts wheat starch and 3.0 parts corn starch. The calcined precursor pellets are crushed and screened to a fine powder having an average particle size of about 200 μm.

About 10 g of the crushed precursor pellets are charged to a graphite crucible reactor equipped with a perforated graphite distributor plate at its base. The crushed pellets form a bed. The distributor plate distributes nitrogen gas as it flows upward through the bed and fluidizes the crushed pellets during reaction. Temperature was measured.

The reactor is brought to an operating temperature of 1700° C. (as measured by an optical pyrometer focused on the bed from above). The reaction can be followed by using an infrared carbon monoxide analyzer to measure the amount of by-product carbon monoxide generated during reaction. Even though this technique indicates that the reaction is essentially complete in about 15 minutes, the reactor and its contents are maintained at 1700° C. for a total of 90 minutes before they are cooled to ambient temperature. Dust generation during this period is minimal, an indication that the condensation reaction product binder provides sufficient strength to the crushed pellets during reaction.

After cooling, the contents (raw product powder) are removed from the reactor, placed in a quartz boat that is inserted into a tube furnace, and heat treated in a flowing 50/50 mixture of air and nitrogen at 800° C. for about 30 minutes to remove unreacted free carbon. The heat treated product powder has a near white color and is, by x-ray diffraction analysis, a high purity AlN powder. The powder has a monatomic oxygen content (LECO analysis) of 1.3 wt-% and a Brunauer-Emmett-Teller (BET) surface area of about 3.7 $m^2/g$.

This example demonstrates that a starch/melamine binder system can be effectively used to bind precursor materials for carbothermal synthesis of AlN in a fluidized bed reactor. Similar results are expected with other raw materials, binder combinations and process conditions, all of which are disclosed herein.

What is claimed is:

1. A crush-resistant, porous aggregate comprising carbon, at least one oxide, a binder and, optionally, at least one nonoxide, the binder being a product of a condensation reaction between at least one first reactant that is selected from the group consisting of monosaccharides, disaccharides, polysaccharides, and soy protein, and at least one second reactant having at least one reactive nitrogen-containing moiety, the product being present in an amount within a range of from about 0.1 to about 25 percent by weight, based upon total aggregate weight.

2. The aggregate of claim 1 having a crush strength of at least 20 Newtons.

3. The aggregate of claim 2 wherein the crush strength is ≦500 Newtons.

4. The aggregate of claim 1 wherein the oxide is selected from the group consisting of aluminum oxide, silicon dioxide, titanium dioxide, zirconium oxide, tungsten oxide, molybdenum oxide, boron oxide, chromium oxide, hafnium oxide, niobium oxide, tantalum oxide and vanadium oxide.

5. The aggregate of claim 1 wherein the carbon is selected from the group consisting of carbon black, and products resulting from calcination of a carbohydrate, a hydrocarbon or an organic polymer.

6. The aggregate of claim 5 wherein the carbohydrate is a starch or a modified starch, the hydrocarbon is petroleum or a residue from petroleum cracking, and the organic polymer is vinylidene chloride.

7. The aggregate of claim 1 wherein the nonoxide is selected from the group consisting of aluminum nitride, boron nitride, silicon nitride, titanium diboride, boron carbide, silicon carbide, tungsten carbide, zirconium boride, titanium carbide, vanadium carbide, molybdenum carbide and hafnium carbide.

8. The aggregate of claim 1 wherein the first reactant is selected from the group consisting of sucrose, fructose, glucose, mannose, xylose, raffinose, dextrin, amylose, maltose, lactose, arabinose, galactose, amylopectin, glucose polymers xylose polymers, co-polymers of glucose and xylose, invert sugar, molasses from sucrose refining, whey from milk processing, methylcellulose, ethylcellulose, hydroxypropylmethylcellulose, hydroxyethylcellulose, carboxymethylcellulose, sodium alginate, and starch.

9. The aggregate of claim 1 wherein the second reactant is selected from the group consisting of amines and amides.

10. The aggregate of claim 9 wherein the second reactant is selected from the group consisting of cyanoguanadine, melamine, urea, hexamethylene tetramine, trimethylamine, diethanolamine, triethanolamine, tetramethylene diamine, acetoguanamine, benzyldimethylamine, methylolmelamine, hexamethoxymethyl melamine, N,N'-dimethyl-p-phenylene diamine, tetraaminobenzene, diaminobenzidine, thiourea, formamide, acetamide, benzamide, oxamide, succinamide, malonamide, guanidine, biuret, triuret, dicyandiamide, biurea, ethylene urea, ammelide, ammeline, aminoguanidine, semicarbazide, thiosemicarbazide and acrylamide.

11. A calcined, crush-resistant, porous aggregate comprising carbon, at least one oxide, carbonaceous residue of a binder and, optionally, at least one nonoxide, the binder being a product of a condensation reaction between at least one first reactant that is selected from the group consisting of monosaccharides, disaccharides, polysaccharides, and soy protein, and at least one second reactant having at least one reactive nitrogen-containing moiety.

* * * * *